US011403102B2

(12) United States Patent
Vo et al.

(10) Patent No.: US 11,403,102 B2
(45) Date of Patent: Aug. 2, 2022

(54) TECHNOLOGY TO LEARN AND OFFLOAD COMMON PATTERNS OF MEMORY ACCESS AND COMPUTATION

(71) Applicant: Intel Corporation, Santa Clara, CA (US)

(72) Inventors: Vy Vo, Portland, OR (US); Dipanjan Sengupta, Hillsboro, OR (US); Mariano Tepper, Portland, OR (US); Javier Sebastian Turek, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 173 days.

(21) Appl. No.: 16/914,293

(22) Filed: Jun. 27, 2020

(65) Prior Publication Data

US 2020/0326949 A1  Oct. 15, 2020

(51) Int. Cl.
| | |
|---|---|
| *G06F 9/32* | (2018.01) |
| *G06F 9/50* | (2006.01) |
| *G06F 12/0815* | (2016.01) |
| *G06K 9/62* | (2022.01) |
| *G06N 3/063* | (2006.01) |
| *G06N 3/04* | (2006.01) |
| *G06F 11/34* | (2006.01) |

(52) U.S. Cl.
CPC .......... *G06F 9/321* (2013.01); *G06F 9/5016* (2013.01); *G06F 9/5066* (2013.01); *G06F 11/3457* (2013.01); *G06F 12/0815* (2013.01); *G06K 9/6262* (2013.01); *G06N 3/0454* (2013.01); *G06N 3/063* (2013.01); *G06F 2212/1021* (2013.01)

(58) Field of Classification Search
None
See application file for complete search history.

(56) References Cited

U.S. PATENT DOCUMENTS

| | | | | |
|---|---|---|---|---|
| 7,203,932 B1* | 4/2007 | Gaudet | ............... | G06F 9/45504 717/136 |
| 8,972,958 B1* | 3/2015 | Brewer | ............... | G06F 9/30181 717/135 |
| 2005/0235269 A1* | 10/2005 | K N | ................... | G06F 9/45516 717/136 |

(Continued)

OTHER PUBLICATIONS

Lipton, Z.C et al., A Critical Review of Recurrent Neural Networks for Sequence Learning, 2015, Cornell Univ., arXiv, 38 pages. (Year: 2014).*

(Continued)

*Primary Examiner* — Eric Coleman
(74) *Attorney, Agent, or Firm* — Hanley, Flight and Zimmerman, LLC

(57) ABSTRACT

Systems, apparatuses and methods may provide for technology that recognizes, via a neural network, a pattern of memory access and compute instructions based on an input set of machine instructions, determines, via a neural network, a sequence of instructions to be offloaded for execution by the secondary computing device based on the recognized pattern of memory access and compute instructions, and translates the sequence of instructions to be offloaded from instructions executable by a central processing unit (CPU) into instructions executable by the secondary computing device.

25 Claims, 8 Drawing Sheets

100

(56) References Cited

U.S. PATENT DOCUMENTS

| | | | | |
|---|---|---|---|---|
| 2008/0147376 | A1* | 6/2008 | Wilkinson | G06F 9/3853 703/26 |
| 2014/0136915 | A1* | 5/2014 | Hyde | G06F 11/0703 714/747 |
| 2018/0107489 | A1* | 4/2018 | Gao | G06F 9/3836 |
| 2018/0114117 | A1* | 4/2018 | Lin | G06F 9/46 |
| 2018/0307971 | A1* | 10/2018 | Sinha | G06N 3/08 |
| 2018/0373760 | A1* | 12/2018 | Verma | G06F 16/2453 |
| 2019/0235872 | A1* | 8/2019 | Gellerich | G06F 9/383 |

OTHER PUBLICATIONS

Park, E. et al., Trace Driven Memory Access Patten Recognition in Computational Kernels, 2014, ACM, pp. 25-32. (Year: 2014).*
Jeong, Hyuk-Jin et. al., IONN: Incremental Offloading of Neural Network Computations from Mobile Device to Edge Servers, 2018, ACM, pp. 401-411. (Year: 2018).*
S. Ambrogio et al., "Equivalent-accuracy accelerated neural-network training using analogue memory," Nature, vol. 558, no. 7708, <nature.com/articles/s41586-018-0180-5>, Jun. 7, 2018, 22 pages.
P. Chi et al., "PRIME: A Novel Processing-in-memory Architecture for Neural Network Computation in ReRAM-based Main Memory," ACM SIGARCH Computer Architecture News: vol. 44 Issue 3, Oct. 2016, <dl.acm.org/doi/pdf/10.1109/ISCA.2016.13>, 13 pages.
M. Hashemi et al., "Learning Memory Access Patterns," Mar. 6, 2018, <arxiv.org/abs/1803.02329>, 15 pages.
K. Hsieh et al., "Accelerating pointer chasing in 3D-stacked memory: Challenges, mechanisms, evaluation," 2016 IEEE 34th International Conference on Computer Design (ICCD), Oct. 2016, pp. 25-32, <cs.virginia.edu/~smk9u/in-memory-pointer-chasing-accelerator_iccd16.pdf>.
S. Liao et al., "Machine learning-based prefetch optimization for data center applications,"SC 09 Proceedings of the Conference on High Performance Computing Networking, Storage and Analysis, Nov. 2009, Article No. 56 pp. 1-10, <dl.acm.org/doi/pdf/10.1145/1654059.1654116>.
P. Merolla et al., "A million spiking-neuron integrated circuit with a scalable communication network and interface," Science, vol. 345, No. 6197, pp. 668-673, Aug. 8, 2014 <piazza.com/class_profile/get_resource/j6a4zpph92j1xu/arwjs0zcpu4jg>.
S. Mittal et al., "A Survey of CPU-GPU Heterogeneous Computing Techniques," ACM Comput. Surv., vol. 47, No. 4, Jul. 2015, <dl.acm.org/doi/abs/10.1145/2788396>, 35 pages.
M. Nahmias et al., "Photonic Multiply-Accumulate Operations for Neural Networks," IEEE IEEE Journal of Selected Topics in Quantum Electronics, vol. 26, No. 1, Jan. 2020, <welanded.s3.amazonaws.com/luminous/nahmias2020.pdf>, 18 pages.
D. Pandiyan et al., "Quantifying the energy cost of data movement for emerging smart phone workloads on mobile platforms," 2014 IEEE International Symposium on Workload Characterization (IISWC), Oct. 2014, pp. 171-180.
L. Peled et al., "Semantic locality and context-based prefetching using reinforcement learning," in 2015 ACM/IEEE 42nd Annual International Symposium on Computer Architecture (ISCA), Jun. 2015, pp. 285-297, <dl.acm.org/doi/pdf/10.1145/2749469.2749473>.
S. Rahman et al., "Maximizing Hardware Prefetch Effectiveness with Machine Learning," in 2015 IEEE 17th International Conference on High Performance Computing and Communications, 2015 IEEE 7th International Symposium on Cyberspace Safety and Security, and 2015 IEEE 12th International Conference on Embedded Software and Systems, Aug. 2015, <userweb.cs.txstate.edu/~burtscher/papers/hpcc15.pdf>, 7 pages.
J. Rogers, "Effects of an LSTM Composite Prefetcher," Aug. 2019, <pdfs.semanticscholar.org/81dc/c83a5099d5c3ace6e0fc93e8bbe8f6c3dd75.pdf>, 34 pages.
A. Shaifee et al., "ISAAC: A Convolutional Neural Network Accelerator with In-Situ Analog Arithmetic in Crossbars," ACM SIGARCH Computer Architecture News: vol. 44 Issue 3, Oct. 2016, <dl.acm.org/doi/pdf/10.1109/SCA.2016.12>, pp. 14-26.
M. Shevgoor et al., "Efficiently prefetching complex address patterns," 2015 48th International Symposium on Microarchitecture, Dec. 2015, <http://www.cs.utah.edu/~rajeev/pubs/micro15m.pdf>, 12 pages.
Y. Zeng et al., "Long short term memory based hardware prefetcher: a case study," MEMSYS '17: Proceedings of the International Symposium on Memory Systems, Oct. 2017, <dl.acm.org/doi/pdf/10.1145/3132402.3132405>, 7 pages.

* cited by examiner

```
400 vertex_scatter (vertex v):
    send updates over out-edges of v vertex_gather (vertex v):
    apply updates from in-edges of v while not done
    for all vertices v that need to scatter updates
        vertex_scatter (v)
    for all vertices v that have updates
        vertex_gather (v)
```

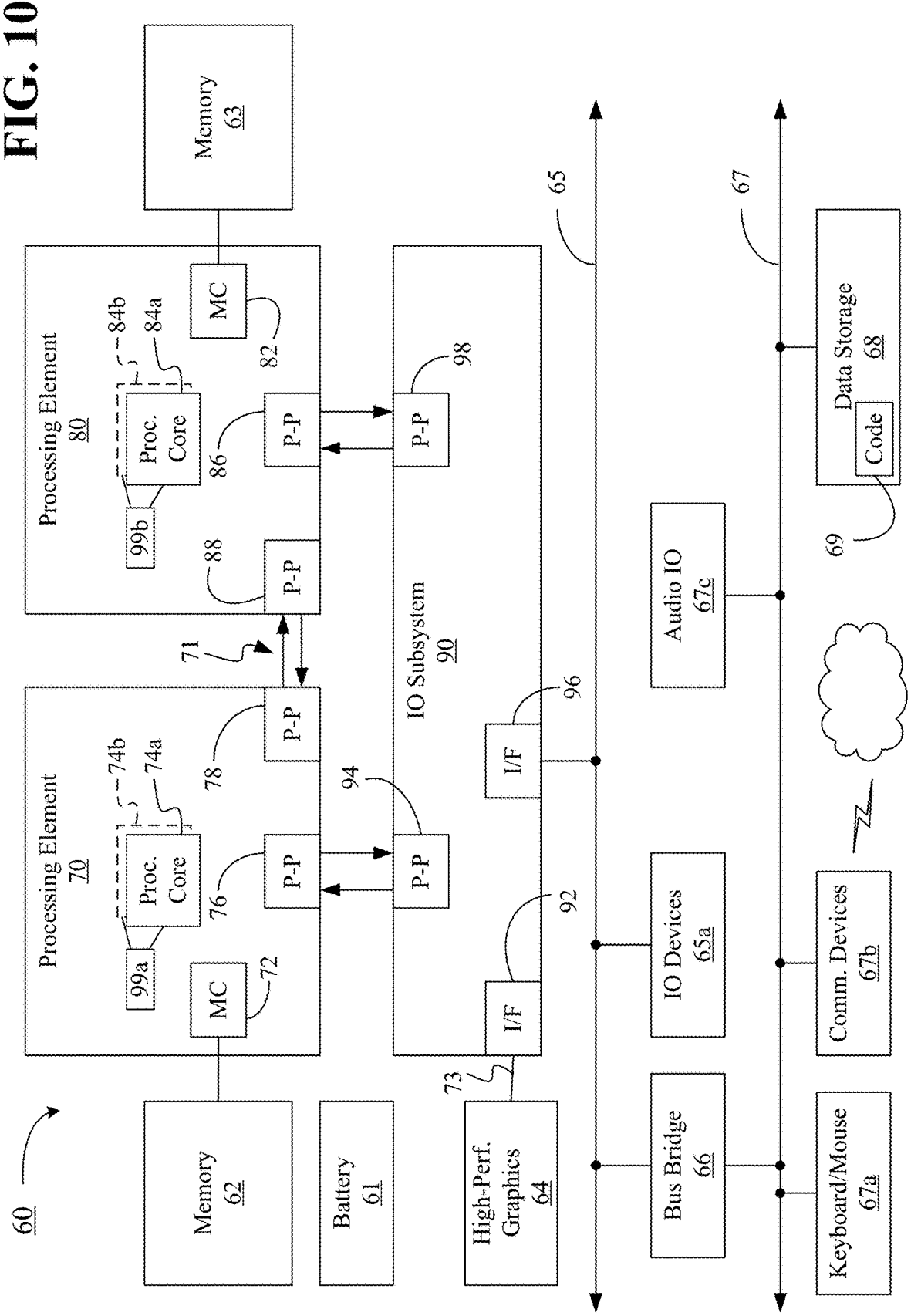

TECHNOLOGY TO LEARN AND OFFLOAD COMMON PATTERNS OF MEMORY ACCESS AND COMPUTATION

TECHNICAL FIELD

Embodiments generally relate to technology for computing systems. More particularly, embodiments relate to technology to automatically route memory access and computing operations for execution by a secondary computing device.

BACKGROUND

A conventional memory architecture assumes that most programs will access the same set of memories repeatedly over a short period of time. That is, they follow rules of spatial and temporal locality. Many applications in graph analytics, machine learning and artificial intelligence (AI), however, exhibit irregular memory access patterns which do not follow conventional rules of spatial and temporal locality. Irregular memory access patterns are handled poorly by conventional CPU and GPU architectures, resulting in unpredictable delays when performing memory operations. One reason for this is that irregular memory accesses require repeated data movement between the CPU and off-chip memory storage.

Moving data between a CPU core and off-chip memory incurs around 100× higher energy than a floating-point operation inside a CPU cores. Traditional, compute-centric von-Neumann architectures are increasingly constrained by memory bandwidth and energy consumption. Hardware devices known as in-memory compute (IMC) or compute near memory (CNM) devices place computing power within or near the memory array itself. These devices may eliminate or greatly reduce the data movement required to execute a program.

While there is no widespread standard specifying how to embed IMC or CNM devices in a computing system, most current approaches require the user to manually map the desired computational kernel to the IMC or CNM memory arrays. This approach is quite inflexible, making it difficult to configure these devices for a variety of diverse applications. Furthermore, because this approach relies on static compilation of an application, they cannot adapt to dynamic aspects of real-world application execution (e.g. dynamic resource usage, workload characteristics, memory access patterns, etc.).

BRIEF DESCRIPTION OF THE DRAWINGS

The various advantages of the embodiments will become apparent to one skilled in the art by reading the following specification and appended claims, and by referencing the following drawings, in which:

FIG. 10 is a block diagram illustrating an example of a multiprocessor-based computing system according to one or more embodiments.

DESCRIPTION OF EMBODIMENTS

In general, embodiments provide a computing system that automatically offloads sequences of machine instructions and memory accesses to a secondary computing device, such as an in-memory compute (IMC) device or a compute near memory (CNM) device. Embodiments also provide for determining which memory access and computing operations to route to IMC/CNM hardware based on identifying relationships between memory access and computing. Additionally, embodiments include technology to exploit dependencies that exist between memory operations and other instructions to learn and predict sequences having these dependencies.

More particularly, embodiments of the computing system provide a memory system that uses a secondary computing device and trainable machine learning components to intelligently route compute and memory operations between the CPU and the secondary device. The computing system, according to embodiments, automatically learns to recognize common patterns of memory access and compute instructions, determine whether it is useful to offload the sequence from the CPU to the secondary computing device, and map machine instructions from the CPU to the secondary computing device for execution. Additionally, embodiments provide technology that will preferentially offload sequences that would result in high latency from memory operations, such as cache misses from irregular memory access, or memory operations that would normally require widespread cache coherence updates. Thus, embodiments will speed up program execution times and relieve memory bottlenecks, including in multi-threaded applications where there may be many ongoing competing demands for CPU resources.

Figure 1:
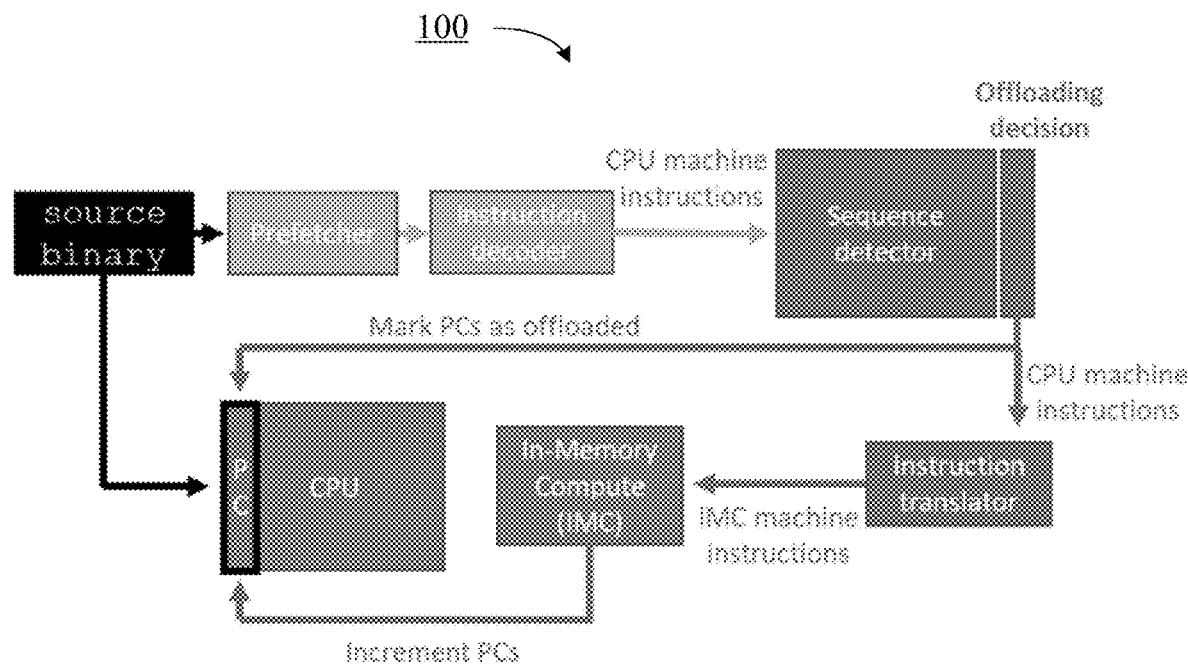
FIG. 1 is a block diagram illustrating an example of a system for offloading sequences of machine instructions and memory accesses according to one or more embodiments.

FIG. 1 is a block diagram illustrating an example of a computing system 100 for offloading sequences of machine instructions and memory accesses according to one or more embodiments, with reference to components and features described herein including but not limited to the figures and associated description. The system may include a prefetcher unit, an instruction decoder, a sequence detector, a decision engine, a central processing unit (CPU) with a program counter (PC), a secondary computing device (shown in FIG. 1 as an IMC) and an instruction translator. While FIG. 1 illustrates an in-memory compute (IMC) device as the secondary computing device, the system may equivalently use a compute near memory (CNM) as the secondary computing device.

The computing system 100 may operate by loading binary code for an application into memory. The binary code may then be provided as an input to the CPU, as well as to a hardware prefetcher; the hardware prefetcher may include a large look-ahead window. The prefetcher may collect an ordered sequence of binary code that needs to be executed. The CPU may begin executing these instructions using its normal cycle, while the prefetched binary code may be decoded into machine instructions using the instruction decoder (which may be a copy of the CPU decoder). The decoded machine instructions may be provided as input to the sequence detector, which may detect recurring sequences that can be offloaded to the secondary computing device (IMC, as illustrated in FIG. 1). A decision engine (labeled in FIG. 1 as Offloading decision) may determine which instruction sequences may be offloaded. The offloaded CPU instructions may be translated via the instruction translator into instructions for the in-memory compute (IMC) hardware, which may then execute those instructions in parallel with the CPU.

To maintain the correct order of program execution, the first address of the offloaded instruction may be specially marked in the program counter (PC) with a dedicated value indicating that it is being processed elsewhere. Once the IMC has finished executing the offloaded instructions, the IMC may store computed results back into main memory. The IMC may also increment the corresponding program counter to the address of the next instruction to be fetched by the CPU. The CPU may then resume processing the application at the following instruction until the next offload decision is made.

In some embodiments, the IMC may act as the main memory during normal CPU execution. As such, the memory load and store operations from the CPU may be handled as usual. When the system decides, via the sequence detector, to offload certain computations to the IMC, the translated code may be sent to the IMC controller. The IMC controller may queue execution of this translated code and appropriately schedule execution whenever the resource is available. Because there is no memory copying involved in this process (that is, updates to memory are in-place), the memory addresses in the code being executed by the IMC remain the same as that of the CPU code. Results computed in the IMC may be transferred back to the CPU and stored in CPU registers; in such cases, this happens before the CPU resumes processing.

In other embodiments, the IMC and main memory (e.g., DRAM) may be separate. In such a scenario, the system must copy data back and forth between the IMC and main memory to maintain consistency across the copies. Address mapping between the IMC and main memory addresses would also be required. Under this alternative scenario, additional hardware logic would be required, and the throughput of the system would be much higher for multi-threaded, read-only workloads.

An analogy may be drawn between operation of the system 100 and multiple memory systems believed to be present in the brain. It has been proposed that the brain includes is a procedural memory system that automatically learns to detect frequently used sequences of operations, and offloads them to a separate neural system that is protected from interference by the main memory system. This purports to free the main memory systems for use and makes the execution of operations in procedural memory faster, so that they often proceed automatically (i.e., without conscious thought). Likewise, the system 100 operates via a procedural memory system (IMC/CNM) with trainable machine learning components (i.e. sequence detector, offloading decision) to intelligently route compute and memory operations between the CPU and the IMC/CNM.

Adaptive Sequence Detector

The sequence detector of the system 100 (FIG. 1, already discussed) may be an adaptive algorithm that learns to recognize common sequences of memory access and computation. In some embodiments, the sequence detector may be trained to only recognize sequences which can be offloaded with an execution time benefit. Machine instructions from the CPU (or from a CPU instruction decoder), which contain both computational operations (e.g. adding) as well as memory operations (e.g. loading a memory address), may be provided as input to this adaptive algorithm. The algorithm may then learn the transitional probabilities, or sequential dependencies, between instructions to automatically detect recurring sequences involving compute and memory operations.

Figure 2:
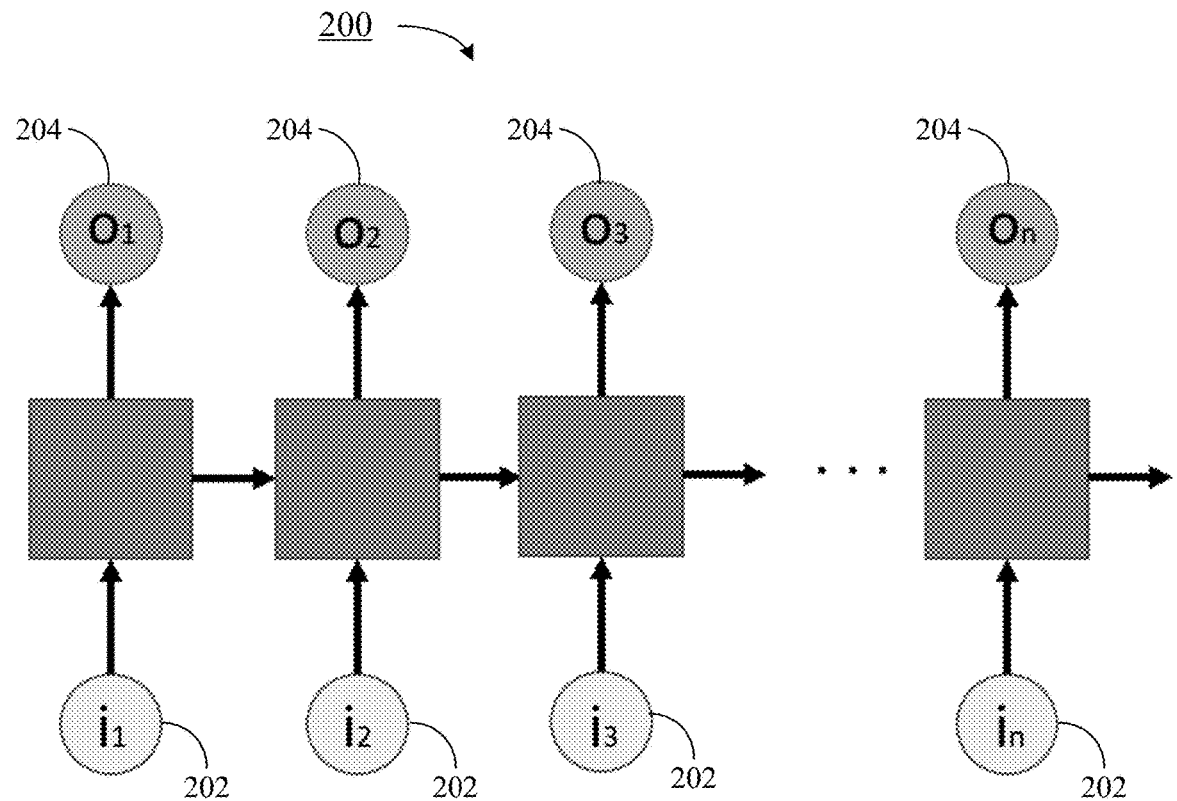
FIG. 2 is a diagram illustrating diagram of an example of a sequence detector according to one or more embodiments.

An adaptive algorithm for sequence detection in the system 100 may be implemented via a trained neural network. In some embodiments, the neural network may be implemented in a field programmable gate array (FPGA) accelerator. In an embodiment, the neural network may be implemented in a combination of a processor and a FPGA accelerator. In some embodiments, a recurrent neural network (RNN) may be used to implement the adaptive sequence detection algorithm. A recurrent neural network may take a sequence of machine instructions and output a sequence of decisions about whether to offload the instructions. FIG. 2 is a diagram illustrating an example of a sequence detector 200 according to one or more embodiments, with reference to components and features described herein including but not limited to the figures and associated description. As shown in FIG. 2, the sequence detector is a RNN. The RNN may receive as input a sequence of machine instructions $\{i_1, i_2, i_3, \ldots i_n\}$ (labeled as elements 202), and may output a sequence of decisions $\{o_1, o_2, o_3, \ldots o_n\}$ (labeled as elements 204) about whether to offload the instructions. Given a machine instruction i (e.g., $i_2$) and the previous RNN state (box), the RNN outputs a True or False value (e.g., $o_2$) about offloading the instruction (e.g., $i_2$) to the IMC hardware.

In some embodiments, the prefetcher may have large look-ahead window, and the RNN may process instructions that have yet to be executed on the CPU. In such a case, if the RNN makes a decision to offload instructions, additional logic may be used to mark the offloaded instructions in the program counter on the CPU.

The feedforward pass of the RNN may be implemented in hardware such as, e.g., the Intel® Gaussian Neural Accelerator (GNA). In some embodiments another neural network model may be used as a sequence detector, and in such cases the other neural network model may likewise be implemented in hardware via, e.g., the Intel® Gaussian Neural Accelerator (GNA).

In some embodiments, the RNN may be trained in a hardware simulation with benchmarks known to increase cache misses and cause memory latency issues. In running a training simulation, training data would include information (known as "oracle data") about whether it is appropriate to offload a given instruction to the IMC. Such oracle data must include overall execution time, but may also include other data such as markers for the start and end of repeated sequences. The oracle data may be used to construct an appropriate error signal for training with error backpropagation. The goal of training the RNN is for the RNN to remember sequences that result in cache misses.

In other embodiments, the RNN may be trained to directly predict cache misses. In this scenario, the RNN may be directly trained to detect sequences that result in long latencies of memory access. Logic (e.g., an algorithm) may be added for converting the RNN output (i.e., a sequence of predicted cache misses) into offloading decisions, either by adding another neural network layer, or by creating a set of static rules for offloading.

In another embodiment, the RNN may be trained by embedding the RNN in a reinforcement learning agent. The environmental state of the reinforcement learning agent is the sequence of instructions, and the actions it takes are to decide whether to offload the instructions. The agent is rewarded proportionally to the execution time of the instructions. Accordingly, the sequence detector may run independently without intervention by the user.

After training the RNN in simulation, a "fine-tuning" mode may be used to continue modifying the RNN weights to optimize for a specific application. The fine-tuning mode may be run until average execution times decrease. Once suitable performance is obtained after fine-tuning, the RNN may be run in inference mode (with the weights static or frozen).

In-Memory Compute (IMC) Hardware

Hardware devices known as in memory compute (IMC) devices may have multiple processors attached to them. Examples of IMC hardware include Non-Volatile Memories (NVMs) like Intel® Optane memory, and resistive memories (ReRAMs). IMC devices enable in-memory computing by re-purposing their memory structures to have in-situ computation capability. For example, ReRAMs store data in the form of resistance of titanium oxides; by sensing the current on the bit-line, the dot-product of the input voltages and cell conductances may be computed using Ohm's and Kirchhoff's laws.

Embodiments may use IMC hardware having a distributed memory array interleaved with small bit logic which may be programmed to execute simple functions on the data "in-memory" in parallel. For example, these memory arrays (up to several thousand distributed memory arrays) plus the tiny compute units may be programmed into a single instruction multiple data (SIMD) processing unit that may compute concurrently, thereby extending the memory array to support in-situ operations like dot product, addition, element-wise multiplication, and subtraction.

According to embodiments, IMC hardware may be employed in a SIMD execution model in which in every cycle the instruction issued to IMC is multi-cast to multiple memory arrays and is executed in lock step. The IMC hardware may also have a pending instruction "request" queue and a scheduler that can implement instruction-level parallelism. Performance may be guided, for example, based on overall capacity and on speed of accessing the memory.

In embodiments, the offloaded sequence may be created as a state machine to be executed on the IMC. If the IMC is beyond its capacity, to achieve optimal instruction throughput eviction policies may determine which state machines should remain on the IMC and which should be evicted back to executing via the host CPU. In some embodiments, recency policies may be used to simply evict the state machine that has been least recently used. In some embodiments, in addition to recency policies the IMC may store information about the efficiency benefits of each state machine and balance recency with the overall benefit of keeping the sequence in the IMC. The scheduler may also consider memory media properties like media wear leveling and thermal state, before creating and executing a state machine schedule, to ensure optimal usage of the in-memory compute hardware.

Instruction Translator

The instruction translator may, according to some embodiments, be implemented as a hardware table that indicates direct mappings between CPU machine instructions and IMC instructions. In most cases, the CPU machine instruction will have a 1:1 mapped equivalent instruction on the IMC. In a small number of cases, there may be a one-to-many mapping—for example, a fuse-multiply-add (FMA) instruction on the CPU may be executed as 3 separate instructions on the IMC device. In the case where the CPU contains an instruction that has no equivalent on the IMC, that instruction should not be offloaded. Any decision to offload such an instruction (or a sequence containing such an instruction) would be an incorrect decision resulting in longer processing latency. Accordingly, those cases where CPU instructions have no mapping on the IMC device may be included in the training data set for the sequence detector and offloading engine, to ensure that the system avoids offloading sequences having such instructions.

Execution Decision Engine

The execution decision engine determines when instruction sequences should be offloaded for execution on the secondary computing device (e.g., IMC). In some embodiments, the execution decision engine may be implemented in logic that is incorporated with the sequence detector. For example, in embodiments where the sequence detector is implemented using a recurrent neural network (FIG. 2, already discussed), the RNN may provide as output the decisions whether to offload a particular instruction sequence, thereby operating as the decision engine. Embodiments implementing the sequence detector using another neural network structure may, likewise, provide the execution decision as an output of the neural network.

In some cases, the overall throughput of the IMC hardware may be lower than the CPU, especially if the IMC is executing several state machines at once while the CPU is idle. Therefore, embodiments may include additional logic to check if the CPU is idle. If the CPU is idle, the execution engine may task both the CPU and the IMC with executing the sequence, take the faster result, and kill (i.e., terminate or stop execution of) the remaining process. To ensure coherence in processing, the pipeline for the slower process may be flushed.

Example Application: Scatter-Gather Programming Model

Figures 3, 4:
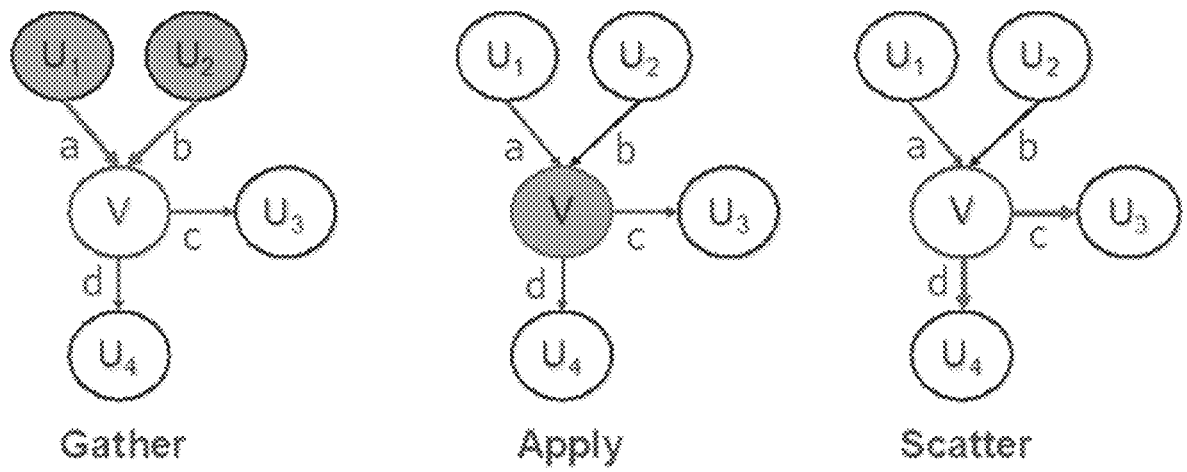
FIGS. 3-5 provide diagrams illustrating aspects of an example application for offloading sequences of machine instructions and memory accesses according to one or more embodiments.

Embodiments for offloading sequences of machine instructions and memory accesses may be applied to algorithms using a scatter-gather programming model. A scatter-gather programming model may be used for computing many graph algorithms, such as, for example, breadth-first search, connected-component labeling, and PageRank. FIG. 3 provides a diagram 300 illustrating the scatter-gather programming model. As illustrated in FIG. 3, there are three key phases of the scatter-gather model: gather, apply, and scatter. The left frame of the diagram in FIG. 3 shows that in the gather phase, a node (V) collects information from its incoming neighbors ($U_1$ and $U_2$). The center frame of the diagram shows that in the apply phase, the node (V) does some computing on the information received in the gather step. The right frame of the diagram shows that in the scatter operation, the node (V) broadcasts some information (which usually contains the result of the apply step), to its outgoing neighbors ($U_3$ and $U_4$). Pseudocode 400 describing the scatter-gather programming model is illustrated in FIG. 4. According to the pseudocode in FIG. 4, the key phases (the apply step is omitted for brevity, but it occurs after every call to vertex_gather) are applied in a loop until some stopping condition is met (e.g., no nodes have updates).

Figure 5:
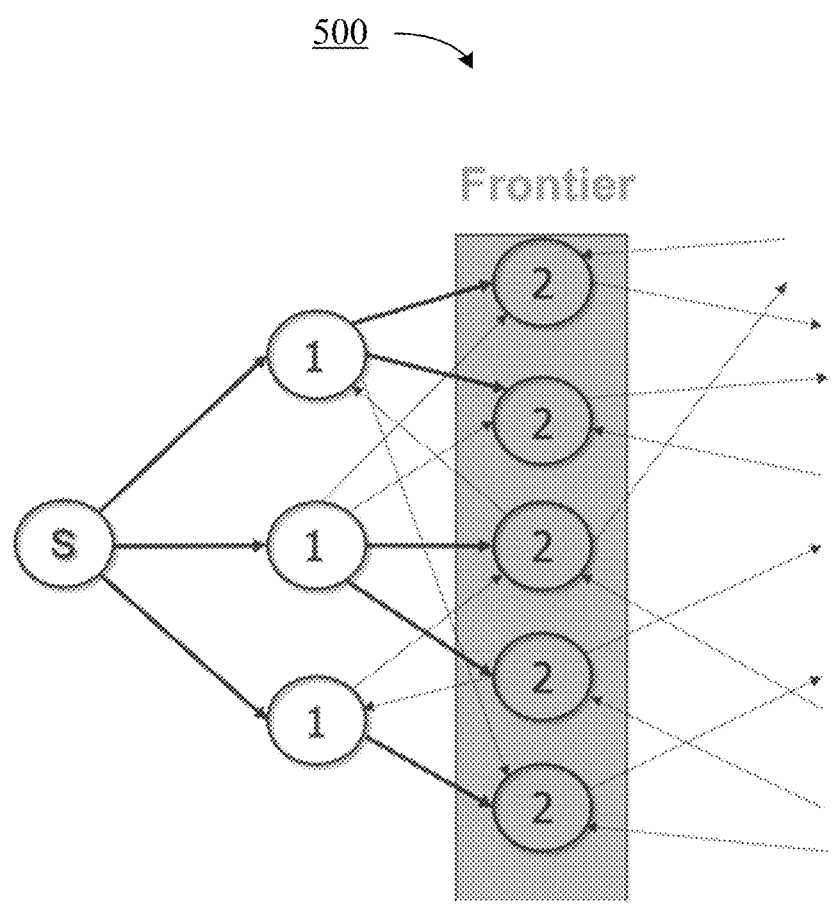

In carrying out an algorithm using the scatter-gather programming model, the computation occurs in a loop, where each iteration consists of a scatter phase and a gather/apply phase. In a given iteration, the set of "active" vertices that need to scatter updates is called the computational frontier. After those vertices scatter updates, the vertices that need to collect updates gather all inputs and apply an updating function using those inputs. The computational loop terminates when the computational frontier becomes empty. By correctly defining the vertex_scatter( ) and vertex_gather( ) functions, a large set of graph algorithms may be computed. FIG. 5 illustrates the computational frontier 500 for a breadth-first search algorithm (BFS) while exploring the second level of a BFS tree. As shown in FIG. 5, all of the nodes in the shaded box are marked as active vertices that require an iteration of the scatter-gather loop.

For a given graph in a scatter-gather programming model, the same computations are executed repeatedly in the apply phase. Since updating each vertex relies on information from other connected vertices, however, executing this loop without offloading may result in pointer chasing, causing cache misses and unpredictable delays in execution. By offloading sequences of machine instructions and memory accesses according to embodiments, execution of this programming model may be accelerated—by learning the most common sequences of computation (from the sequence of operations in the updating function of the apply phase) and memory access (memory locations of the vertices receiving updates during the scatter phase) required for some iteration(s) of the loop. Using the offloading technology as described herein, the data in each vertex would occupy a static set of memory addresses that need to be loaded and stored, and the scatter and gather functions are composed of a set of instructions that operate on the data in each vertex.

Figure 6A:
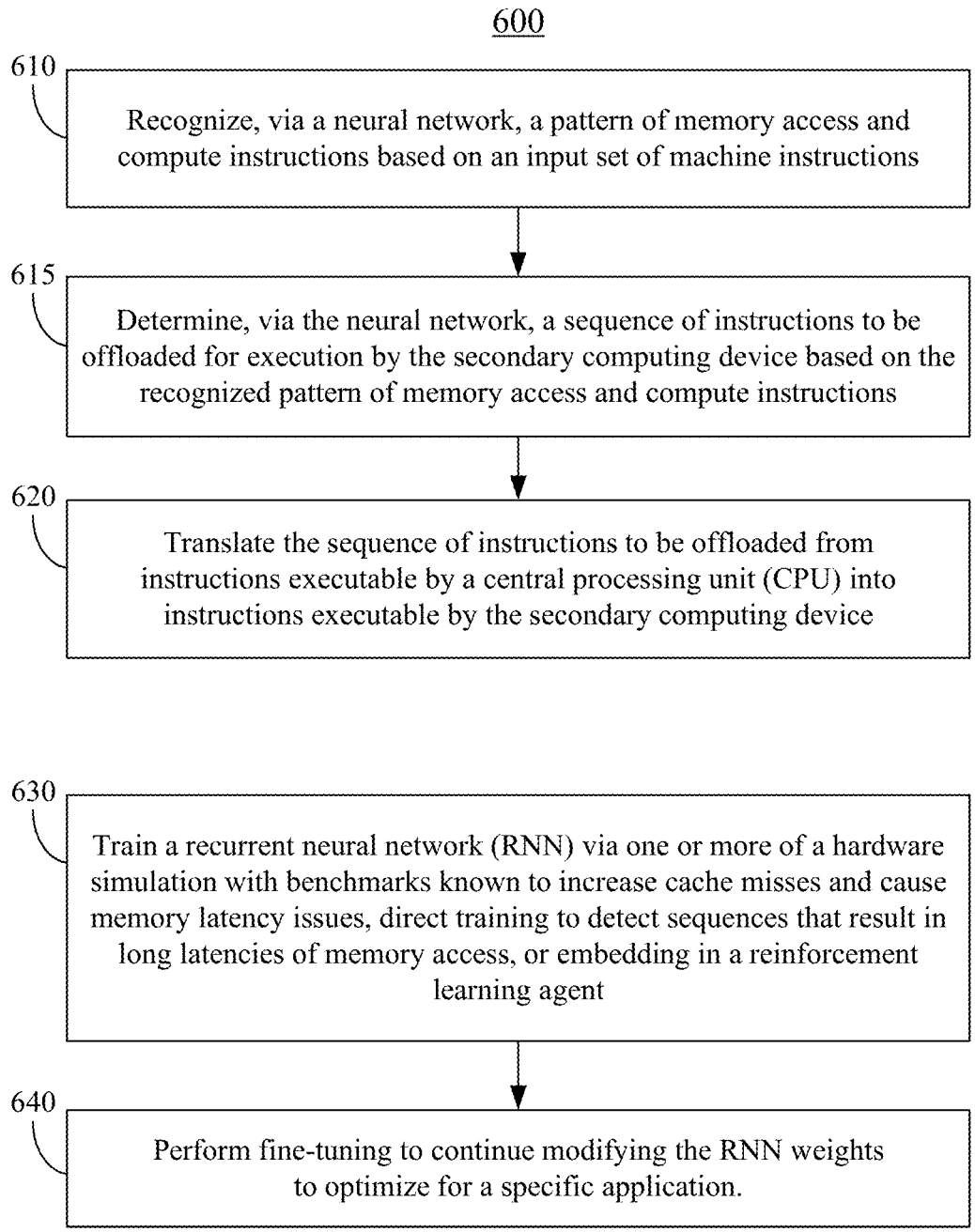
FIGS. 6A-6B provide flowcharts illustrating operation of an example of system for offloading sequences of machine instructions and memory accesses according to one or more embodiments.
Figure 6B:
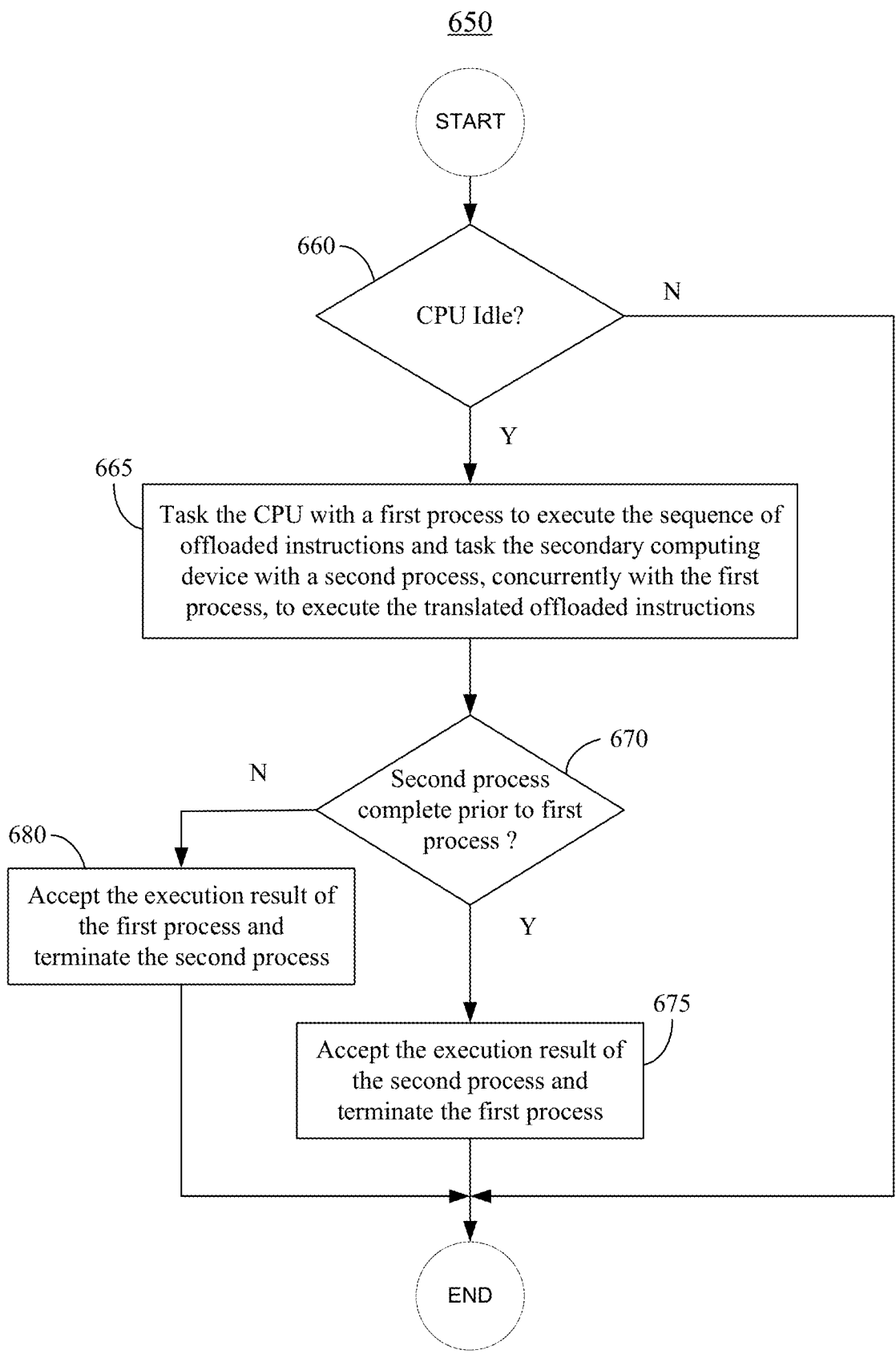

FIGS. 6A-6B provide flowcharts illustrating processes 600 and 650 for operating an example of a system for offloading sequences of machine instructions and memory accesses according to one or more embodiments, with reference to components and features described herein including but not limited to the figures and associated description. The processes 600 and 650 may be implemented in the computing system 100 described herein with reference to FIGS. 1-2, already discussed. More particularly, the processes 600 and 650 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in process 600 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Turning to FIG. 6A for process 600, illustrated processing block 610 provides for recognizing, via a neural network, a pattern of memory access and compute instructions based on an input set of machine instructions. The neural network may be a recurrent neural network (RNN). The pattern of memory access and compute instructions may include one or more of transitional probabilities or sequential dependencies between instructions of the input set of instructions. Illustrated processing block 615 provides for determining, via the neural network, a sequence of instructions to be offloaded for execution by the secondary computing device based on the recognized pattern of memory access and compute instructions. The determined sequence of instructions to be offloaded may include one or more of a recurring sequence, a sequence having an offload execution time benefit, a sequence that would result in high latency from repeated memory operations, and/or a sequence that would result in cache misses. Illustrated processing block 620 provides for translating the sequence of instructions to be offloaded from instructions executable by a central processing unit (CPU) into instructions executable by the secondary computing device.

Illustrated processing block 630 provides for training a recurrent neural network (RNN) via one or more of a hardware simulation with benchmarks known to increase cache misses and cause memory latency issues, direct training to detect sequences that result in long latencies of memory access, or embedding in a reinforcement learning agent. Illustrated processing block 640 provides for performing fine-tuning to continue modifying the RNN weights to optimize for a specific application.

Turning now to FIG. 6B for process 650, at block 660 a check is made to determine if the CPU is idle. If the CPU is not idle, the process terminates. If the CPU is idle, the process continues at illustrated processing block 665, which provides for tasking the CPU with a first process to execute the sequence of offloaded instructions and tasking the secondary computing device with a second process, concurrently with the first process, to execute the translated offloaded instructions. At block 670 it is determined if the second process completes prior to the first process. If yes (i.e., the second process completes prior to the first process), illustrated processing block 675 provides for accepting the execution result of the second process and terminating the first process. Otherwise, if the second process does not complete prior to the first process, then illustrated processing block 680 provides for accepting the execution result of the first process and terminating the second process.

Figure 7:
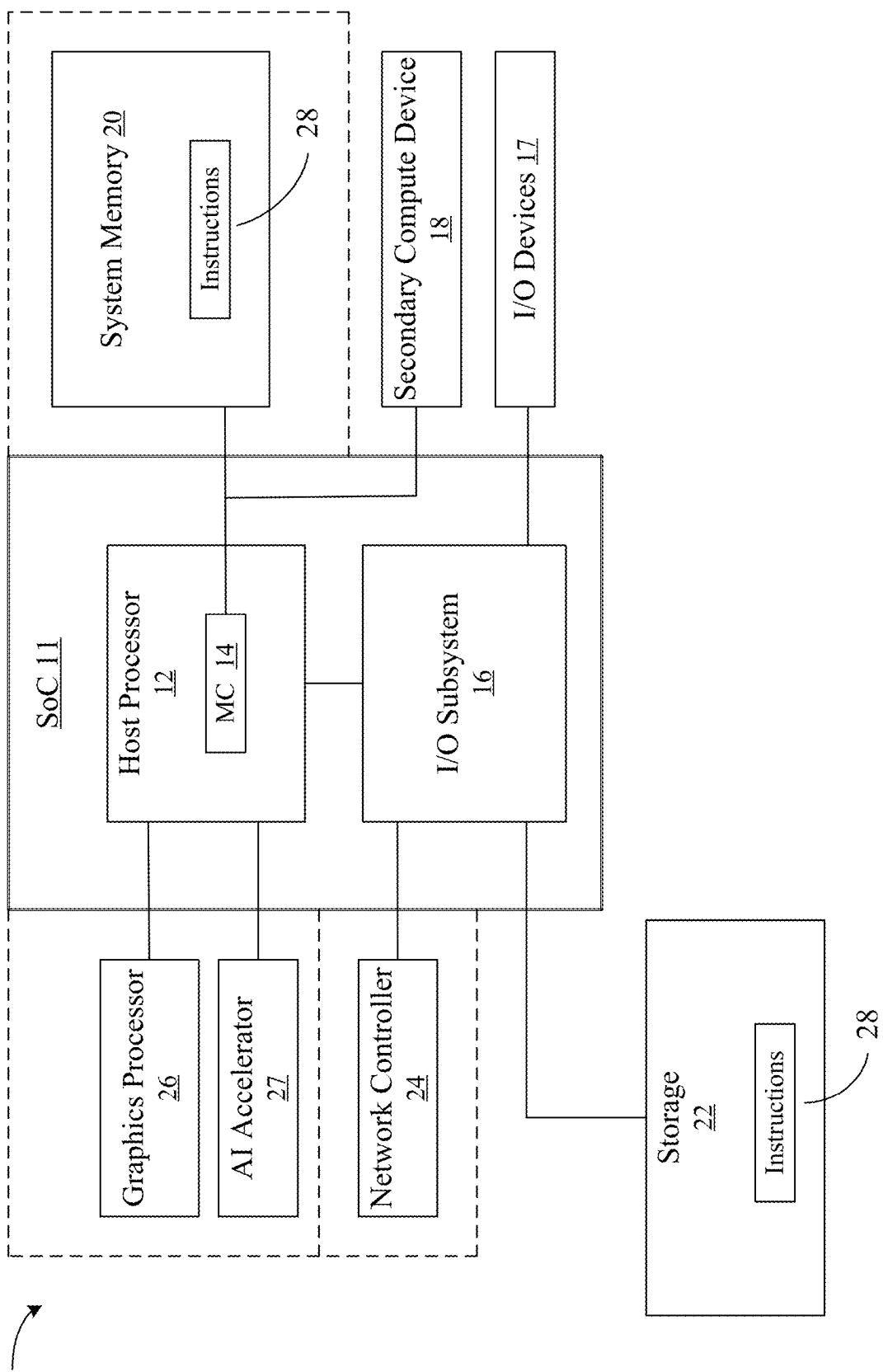
FIG. 7 is a block diagram illustrating an example of a performance-enhanced computing system according to one or more embodiments.

FIG. 7 shows a block diagram illustrating an example computing system 10 for offloading memory access and computing operations for execution by a secondary computing device according to one or more embodiments, with reference to components and features described herein including but not limited to the figures and associated description. The system 10 may generally be part of an electronic device/platform having computing and/or communications functionality (e.g., server, cloud infrastructure controller, database controller, notebook computer, desktop computer, personal digital assistant/PDA, tablet computer, convertible tablet, smart phone, etc.), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), Internet of Things (IoT) functionality, etc., or any combination thereof. In the illustrated example, the system 10 may include a host processor 12 (e.g., central processing unit/CPU) having an integrated memory controller (MC) 14 that may be coupled to system memory 20. The host processor 12 may include any type of processing device, such as, e.g., microcontroller, microprocessor, RISC processor, ASIC, etc., along with associated processing modules or circuitry. The system memory 20 may include any non-transitory machine- or computer-readable storage medium such as RAM, ROM, PROM, EEPROM, firmware, flash memory, etc., configurable logic such as, for example, PLAs, FPGAs, CPLDs, fixed-functionality hardware logic using circuit technology such as, for example, ASIC, CMOS or TTL technology, or any combination thereof suitable for storing instructions 28.

The system 10 may also include an input/output (I/O) subsystem 16. The I/O subsystem 16 may communicate with for example, one or more input/output (I/O) devices 17, a network controller 24 (e.g., wired and/or wireless NIC), and storage 22. The storage 22 may be comprised of any appropriate non-transitory machine- or computer-readable memory type (e.g., flash memory, DRAM, SRAM (static random access memory), solid state drive (SSD), hard disk drive (HDD), optical disk, etc.). The storage 22 may include mass storage. In some embodiments, the host processor 12 and/or the I/O subsystem 16 may communicate with the storage 22 (all or portions thereof) via the network controller 24. In some embodiments, the system 10 may also include a graphics processor 26 (e.g., graphics processing unit/GPU) and an AI accelerator 27. In some embodiments, the system 10 may also include a secondary compute device 18 such as, e.g., an in-memory compute (IMC) device or a compute near memory (CNM) device. In an embodiment, the system 10 may also include a vision processing unit (VPU), not shown.

The host processor 12 and the I/O subsystem 16 may be implemented together on a semiconductor die as a system on chip (SoC) 11, shown encased in a solid line. The SoC 11 may therefore operate as a computing apparatus that automatically routes memory access and computing operations for execution by a secondary computing device. In some embodiments, the SoC 11 may also include one or more of the system memory 20, the network controller 24, the graphics processor 26 and/or the AI accelerator 27 (shown encased in dotted lines). In some embodiments, the SoC 11 may also include other components of the system 10.

The host processor 12, the I/O subsystem 16, the graphics processor 26, the AI accelerator 27 and/or the VPU may execute program instructions 28 retrieved from the system memory 20 and/or the storage 22 to perform one or more aspects of the processes 600 and 650 as described herein with reference to FIGS. 6A-6B. Thus, for example, execution of instructions 28 may cause the SoC 11 to recognize, via a neural network, a pattern of memory access and compute instructions based on an input set of machine instructions, determine, via the neural network, a sequence of instructions to be offloaded for execution by the secondary computing device based on the recognized pattern of memory access and compute instructions, and translate the sequence of instructions to be offloaded from instructions executable by a central processing unit (CPU) into instructions executable by the secondary computing device. The system 10 may implement one or more aspects of the computing system 100, the sequence detector, the decision engine, and/or the instruction translator as described herein with reference to FIGS. 1-2. The system 10 is therefore considered to be performance-enhanced at least to the extent that at least to the extent that the system intelligently routes compute and memory operations between the CPU and the secondary computing device to increase computing performance and reduce execution time.

Computer program code to carry out the processes described above may be written in any combination of one or more programming languages, including an object-oriented programming language such as JAVA, JAVASCRIPT, PYTHON, SMALLTALK, C++ or the like and/or conventional procedural programming languages, such as the "C" programming language or similar programming languages, and implemented as program instructions 28. Additionally, program instructions 28 may include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, microprocessor, etc.).

The I/O devices 17 may include one or more of input devices, such as a touch-screen, keyboard, mouse, cursor-control device, touch-screen, microphone, digital camera, video recorder, camcorder, biometric scanners and/or sensors; input devices may be used to enter information and interact with system 10 and/or with other devices. The I/O devices 17 may also include one or more of output devices, such as a display (e.g., touch screen, liquid crystal display/LCD, light emitting diode/LED display, plasma panels, etc.), speakers and/or other visual or audio output devices. Input and/or output devices may be used, e.g., to provide a user interface.

Figure 8:
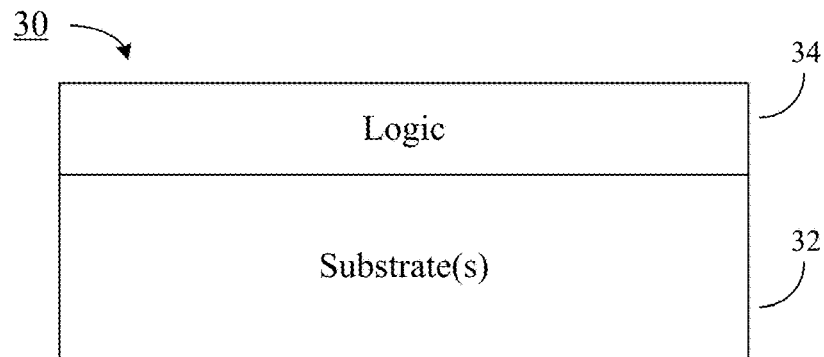
FIG. 8 is a block diagram illustrating an example semiconductor apparatus according to one or more embodiments.

FIG. 8 shows a block diagram illustrating an example semiconductor apparatus 30 for offloading memory access and computing operations for execution by a secondary computing device according to one or more embodiments, with reference to components and features described herein including but not limited to the figures and associated description. The semiconductor apparatus 30 may be implemented, e.g., as a chip, die, or other semiconductor package. The semiconductor apparatus 30 may include one or more substrates 32 comprised of, e.g., silicon, sapphire, gallium arsenide, etc. The semiconductor apparatus 30 may also include logic 34 comprised of, e.g., transistor array(s) and other integrated circuit (IC) components) coupled to the substrate(s) 32. The logic 34 may be implemented at least partly in configurable logic or fixed-functionality logic hardware. The logic 34 may implement the system on chip (SoC) 11 described above with reference to FIG. 7. The logic 34 may implement one or more aspects of the processes described above, including the processes 600 and 650 as described herein with reference to FIGS. 6A-6B. The logic 34 may implement one or more aspects of the computing system 100, the sequence detector, the decision engine, and/or the instruction translator as described herein with reference to FIGS. 1-2. The apparatus 30 is therefore considered to be performance-enhanced at least to the extent that at least to the extent that the system intelligently routes compute and memory operations between the CPU and the secondary computing device to increase computing performance and reduce execution time.

The semiconductor apparatus 30 may be constructed using any appropriate semiconductor manufacturing processes or techniques. For example, the logic 34 may include transistor channel regions that are positioned (e.g., embedded) within substrate(s) 32. Thus, the interface between the logic 34 and the substrate(s) 32 may not be an abrupt junction. The logic 34 may also be considered to include an epitaxial layer that is grown on an initial wafer of the substrate(s) 34.

Figure 9:
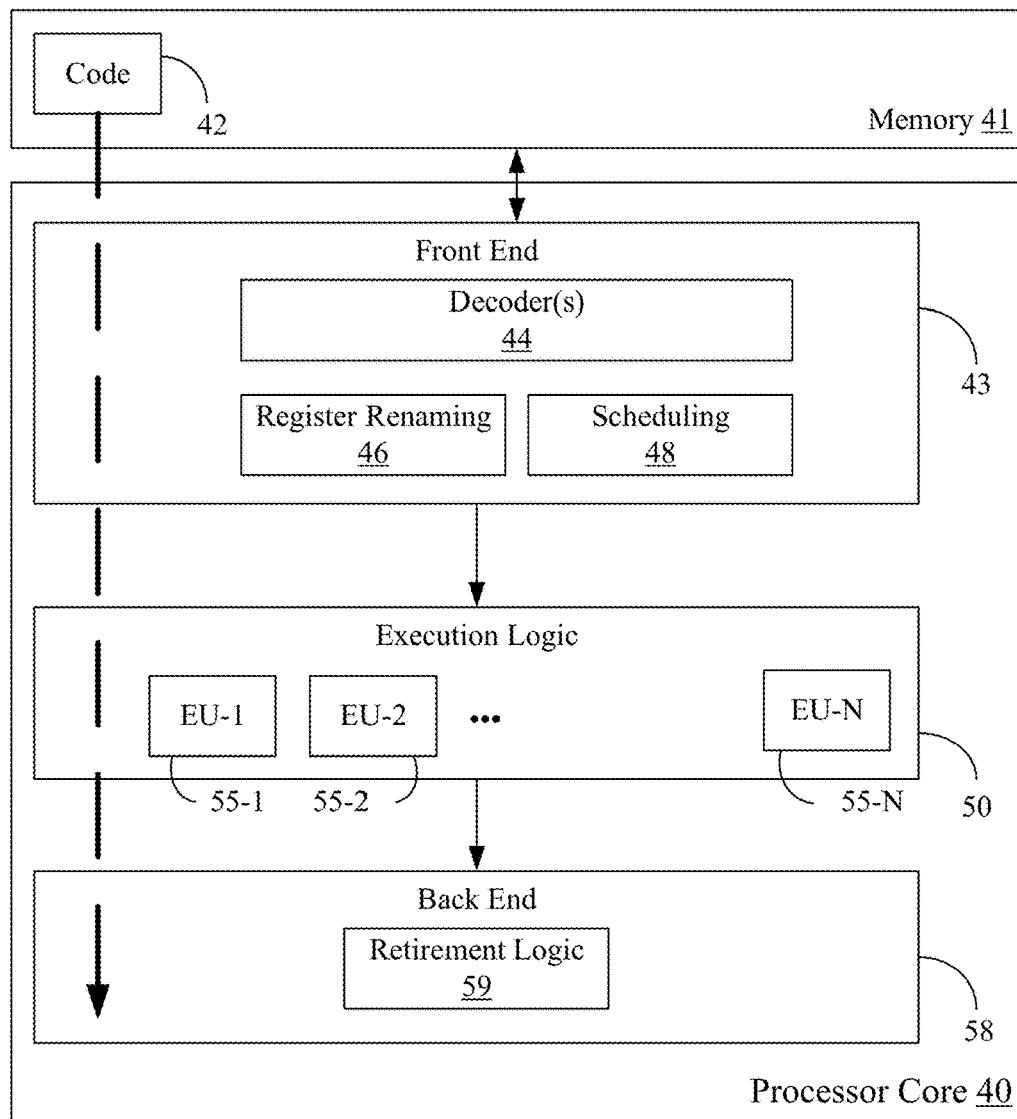
FIG. 9 is a block diagram illustrating an example of a processor according to one or more embodiments.

FIG. 9 is a block diagram illustrating an example processor core 40 according to one or more embodiments, with reference to components and features described herein including but not limited to the figures and associated description. The processor core 40 may be the core for any type of processor, such as a micro-processor, an embedded processor, a digital signal processor (DSP), a network processor, or other device to execute code. Although only one processor core 40 is illustrated in FIG. 9, a processing element may alternatively include more than one of the processor core 40 illustrated in FIG. 9. The processor core 40 may be a single-threaded core or, for at least one embodiment, the processor core 40 may be multithreaded in that it may include more than one hardware thread context (or "logical processor") per core.

FIG. 9 also illustrates a memory 41 coupled to processor core 40. The memory 41 may be any of a wide variety of memories (including various layers of memory hierarchy) as are known or otherwise available to those of skill in the art. The memory 41 may include one or more code 42 instruction(s) to be executed by the processor core 40. The code 42 may implement one or more aspects of the processes 600 and 650 described herein with reference to FIGS. 6A-6B. The processor core 40 may implement one or more aspects of the computing system 100, the sequence detector, the decision engine, and/or the instruction translator as described herein with reference to FIGS. 1-2. The processor core 40 follows a program sequence of instructions indicated by the code 42. Each instruction may enter a front end portion 43 and be processed by one or more decoders 44. The decoder 44 may generate as its output a micro operation such as a fixed width micro operation in a predefined format, or may generate other instructions, microinstructions, or control signals which reflect the original code instruction. The illustrated front end portion 43 also includes register renaming logic 46 and scheduling logic 48, which generally allocate resources and queue the operation corresponding to the convert instruction for execution.

The processor core 40 is shown including execution logic 50 having a set of execution units 55-1 through 55-N. Some embodiments may include a number of execution units dedicated to specific functions or sets of functions. Other embodiments may include only one execution unit or one execution unit that can perform a particular function. The illustrated execution logic 50 performs the operations specified by code instructions.

After completion of execution of the operations specified by the code instructions, back end logic 58 retires the instructions of code 42. In one embodiment, the processor core 40 allows out of order execution but requires in order retirement of instructions. Retirement logic 59 may take a variety of forms as known to those of skill in the art (e.g., re-order buffers or the like). In this manner, the processor core 40 is transformed during execution of the code 42, at least in terms of the output generated by the decoder, the hardware registers and tables utilized by the register renaming logic 46, and any registers (not shown) modified by the execution logic 50.

Although not illustrated in FIG. 9, a processing element may include other elements on chip with the processor core 40. For example, a processing element may include memory control logic along with the processor core 40. The processing element may include I/O control logic and/or may include I/O control logic integrated with memory control logic. The processing element may also include one or more caches.

FIG. 10 is a block diagram illustrating an example of a multi-processor based computing system 60 according to one or more embodiments, with reference to components and features described herein including but not limited to the figures and associated description. Multiprocessor system 60 includes a first processing element 70 and a second processing element 80. While two processing elements 70 and 80 are shown, it is to be understood that an embodiment of the system 60 may also include only one such processing element.

The system 60 is illustrated as a point-to-point interconnect system, wherein the first processing element 70 and the second processing element 80 are coupled via a point-to-point interconnect 71. It should be understood that any or all of the interconnects illustrated in FIG. 10 may be implemented as a multi-drop bus rather than point-to-point interconnect.

As shown in FIG. 10, each of processing elements 70 and 80 may be multicore processors, including first and second processor cores (i.e., processor cores 74a and 74b and processor cores 84a and 84b). Such cores 74a, 74b, 84a, 84b may be configured to execute instruction code in a manner similar to that discussed above in connection with FIG. 9.

Each processing element 70, 80 may include at least one shared cache 99a, 99b. The shared cache 99a, 99b may store data (e.g., instructions) that are utilized by one or more components of the processor, such as the cores 74a, 74b and 84a, 84b, respectively. For example, the shared cache 99a, 99b may locally cache data stored in a memory 62, 63 for faster access by components of the processor. In one or more embodiments, the shared cache 99a, 99b may include one or more mid-level caches, such as level 2 (L2), level 3 (L3), level 4 (L4), or other levels of cache, a last level cache (LLC), and/or combinations thereof.

While shown with only two processing elements 70, 80, it is to be understood that the scope of the embodiments are not so limited. In other embodiments, one or more additional processing elements may be present in a given processor. Alternatively, one or more of the processing elements 70, 80 may be an element other than a processor, such as an accelerator or a field programmable gate array. For example, additional processing element(s) may include additional processors(s) that are the same as a first processor 70, additional processor(s) that are heterogeneous or asymmetric to processor a first processor 70, accelerators (such as, e.g., graphics accelerators or digital signal processing (DSP) units), field programmable gate arrays, or any other processing element. There can be a variety of differences between the processing elements 70, 80 in terms of a spectrum of metrics of merit including architectural, micro architectural, thermal, power consumption characteristics, and the like. These differences may effectively manifest themselves as asymmetry and heterogeneity amongst the processing elements 70, 80. For at least one embodiment, the various processing elements 70, 80 may reside in the same die package.

The first processing element 70 may further include memory controller logic (MC) 72 and point-to-point (P-P) interfaces 76 and 78. Similarly, the second processing element 80 may include a MC 82 and P-P interfaces 86 and 88. As shown in FIG. 10, MC's 72 and 82 couple the processors to respective memories, namely a memory 62 and a memory 63, which may be portions of main memory locally attached to the respective processors. While the MC 72 and 82 is illustrated as integrated into the processing elements 70, 80, for alternative embodiments the MC logic may be discrete logic outside the processing elements 70, 80 rather than integrated therein.

The first processing element 70 and the second processing element 80 may be coupled to an I/O subsystem 90 via P-P interconnects 76 and 86, respectively. As shown in FIG. 10, the I/O subsystem 90 includes P-P interfaces 94 and 98. Furthermore, the I/O subsystem 90 includes an interface 92 to couple the I/O subsystem 90 with a high performance graphics engine 64. In one embodiment, a bus 73 may be used to couple the graphics engine 64 to the I/O subsystem 90. Alternately, a point-to-point interconnect may couple these components.

In turn, the I/O subsystem 90 may be coupled to a first bus 65 via an interface 96. In one embodiment, the first bus 65 may be a Peripheral Component Interconnect (PCI) bus, or a bus such as a PCI Express bus or another third generation I/O interconnect bus, although the scope of the embodiments are not so limited.

As shown in FIG. 10, various I/O devices 65a (e.g., biometric scanners, speakers, cameras, sensors) may be coupled to the first bus 65, along with a bus bridge 66 which may couple the first bus 65 to a second bus 67. In one embodiment, the second bus 67 may be a low pin count (LPC) bus. Various devices may be coupled to the second bus 67 including, for example, a keyboard/mouse 67a, communication device(s) 67b, and a data storage unit 68 such as a disk drive or other mass storage device which may include code 69, in one embodiment. The illustrated code 69 may implement one or more aspects of the processes described above, including the processes 600 and 650 as described herein with reference to FIGS. 6A-6B. The illustrated code 69 may be similar to the code 42 (FIG. 9), already discussed. Further, an audio I/O 67c may be coupled to second bus 67 and a battery 61 may supply power to the computing system 60. The system 60 may implement one or more aspects of the computing system 100, the sequence detector, the decision engine, and/or the instruction translator as described herein with reference to FIGS. 1-2.

Note that other embodiments are contemplated. For example, instead of the point-to-point architecture of FIG. 10, a system may implement a multi-drop bus or another such communication topology. Also, the elements of FIG. 10 may alternatively be partitioned using more or fewer integrated chips than shown in FIG. 10.

Embodiments of each of the above systems, devices, components and/or methods, including the system 10, the semiconductor apparatus 30, the processor core 40, the system 60, the computing system 100, the sequence detector, the decision engine, the instruction translator, the processes 600 and 650, and/or any other system components, may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of the foregoing systems and/or components and/or methods may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages.

Additional Notes and Examples

Example 1 includes a computing system comprising a secondary computing device, and an apparatus coupled to the secondary computing device, the apparatus including one or more substrates and logic coupled to the one or more substrates, wherein the logic is implemented at least partly in one or more of configurable logic or fixed-functionality hardware logic, the logic coupled to the one or more substrates to recognize, via a neural network, a pattern of memory access and compute instructions based on an input set of machine instructions, determine, via the neural network, a sequence of instructions to be offloaded for execution by the secondary computing device based on the recognized pattern of memory access and compute instructions, and translate the sequence of instructions to be offloaded from instructions executable by a central processing unit (CPU) into instructions executable by the secondary computing device.

Example 2 includes the system of Example 1, wherein the neural network comprises a recurrent neural network (RNN), wherein the pattern of memory access and compute instructions includes one or more of transitional probabilities or sequential dependencies between instructions of the input set of instructions, wherein the sequence of instructions to be offloaded includes one or more of a recurring sequence, a sequence having an offload execution time benefit, a sequence that would result in high latency from repeated memory operations, or a sequence that would result in cache misses, and wherein the logic coupled to the one or more substrates is further to mark the instructions to be offloaded in a program counter on the CPU.

Example 3 includes the system of Example 2, wherein the RNN is trained via one or more of a hardware simulation with benchmarks known to increase cache misses and cause memory latency issues, direct training to detect sequences that result in long latencies of memory access, or embedding the RNN in a reinforcement learning agent.

Example 4 includes the system of Example 1, wherein the logic coupled to the one or more substrates is further to, when the CPU is idle, task the CPU with a first process to execute the sequence of offloaded instructions, task the secondary computing device with a second process, concurrently with the first process, to execute the translated offloaded instructions, if the second process completes prior to the first process, accept an execution result of the second process and terminate the first process, and otherwise, if the second process does not complete prior to the first process, accept an execution result of the first process and terminate the second process.

Example 5 includes the system of Example 1, wherein the input set of machine instructions may be provided via a hardware prefetcher having large look-ahead window to capture binary source code and an instruction decoder to decode the captured binary source code into machine instructions.

Example 6 includes the system of any of Examples 1-5, wherein the logic to translate the sequence of instructions to be offloaded comprises a hardware table that includes direct mapping between the instructions executable by the CPU and the instructions executable by the secondary computing device.

Example 7 includes a semiconductor apparatus comprising one or more substrates, and logic coupled to the one or more substrates, wherein the logic is implemented at least partly in one or more of configurable logic or fixed-functionality hardware logic, the logic coupled to the one or more substrates to recognize, via a neural network, a pattern of memory access and compute instructions based on an input set of machine instructions, determine, via the neural network, a sequence of instructions to be offloaded for execution by a secondary computing device based on the recognized pattern of memory access and compute instructions, and translate the sequence of instructions to be offloaded from instructions executable by a central processing unit (CPU) into instructions executable by the secondary computing device.

Example 8 includes the semiconductor apparatus of Example 7, wherein the neural network comprises a recurrent neural network (RNN), wherein the pattern of memory access and compute instructions includes one or more of transitional probabilities or sequential dependencies between instructions of the input set of instructions, wherein the sequence of instructions to be offloaded includes one or more of a recurring sequence, a sequence having an offload execution time benefit, a sequence that would result in high latency from repeated memory operations, or a sequence that would result in cache misses, and wherein the logic coupled to the one or more substrates is further to mark the instructions to be offloaded in a program counter on the CPU.

Example 9 includes the semiconductor apparatus of Example 8, wherein the RNN is trained via one or more of a hardware simulation with benchmarks known to increase cache misses and cause memory latency issues, direct training to detect sequences that result in long latencies of memory access, or embedding the RNN in a reinforcement learning agent.

Example 10 includes the semiconductor apparatus of Example 7, wherein the logic coupled to the one or more substrates is further to, when the CPU is idle, task the CPU with a first process to execute the sequence of offloaded instructions, task the secondary computing device with a second process, concurrently with the first process, to execute the translated offloaded instructions, if the second process completes prior to the first process, accept an execution result of the second process and terminate the first process, and otherwise, if the second process does not complete prior to the first process, accept an execution result of the first process and terminate the second process.

Example 11 includes the semiconductor apparatus of Example 7, wherein the input set of machine instructions may be provided via a hardware prefetcher having large look-ahead window to capture binary source code and an instruction decoder to decode the captured binary source code into machine instructions.

Example 12 includes the semiconductor apparatus of any of Examples 7-11, wherein the logic to translate the sequence of instructions to be offloaded comprises a hardware table that includes direct mapping between the instructions executable by the CPU and the instructions executable by the secondary computing device.

Example 13 includes the semiconductor apparatus of Example 7, wherein the logic coupled to the one or more substrates includes transistor channel regions that are positioned within the one or more substrates.

Example 14 includes at least one non-transitory computer readable storage medium comprising a set of first instructions which, when executed by a computing system, cause the computing system to recognize, via a neural network, a pattern of memory access and compute instructions based on an input set of machine instructions, determine, via the neural network, a sequence of instructions to be offloaded for execution by a secondary computing device based on the recognized pattern of memory access and compute instructions, and translate the sequence of instructions to be offloaded from instructions executable by a central processing unit (CPU) into instructions executable by the secondary computing device.

Example 15 includes the at least one non-transitory computer readable storage medium of Example 14, wherein the neural network comprises a recurrent neural network (RNN), wherein the pattern of memory access and compute instructions includes one or more of transitional probabilities or sequential dependencies between instructions of the input set of instructions, wherein the sequence of instructions to be offloaded includes one or more of a recurring sequence, a sequence having an offload execution time benefit, a sequence that would result in high latency from repeated memory operations, or a sequence that would result in cache misses, and wherein the first instructions, when executed, further cause the computing system to mark the instructions to be offloaded in a program counter on the CPU.

Example 16 includes the at least one non-transitory computer readable storage medium of Example 15, wherein the RNN is trained via one or more of a hardware simulation with benchmarks known to increase cache misses and cause memory latency issues, direct training to detect sequences that result in long latencies of memory access, or embedding the RNN in a reinforcement learning agent.

Example 17 includes the at least one non-transitory computer readable storage medium of Example 14, wherein the first instructions, when executed, further cause the computing system to, when the CPU is idle, task the CPU with a first process to execute the sequence of offloaded instructions, task the secondary computing device with a second process, concurrently with the first process, to execute the translated offloaded instructions, if the second process completes prior to the first process, accept an execution result of the second process and terminate the first process, and otherwise, if the second process does not complete prior to the first process, accept an execution result of the first process and terminate the second process.

Example 18 includes the at least one non-transitory computer readable storage medium of Example 14, wherein the input set of machine instructions may be provided via a hardware prefetcher having large look-ahead window to capture binary source code and an instruction decoder to decode the captured binary source code into machine instructions.

Example 19 includes the at least one non-transitory computer readable storage medium of any of Examples 14-18, wherein to translate the sequence of instructions to be offloaded comprises reading a hardware table that includes direct mapping between the instructions executable by the CPU and the instructions executable by the secondary computing device.

Example 20 includes a method of offloading instructions for execution, comprising recognizing, via a neural network, a pattern of memory access and compute instructions based on an input set of machine instructions, determining, via the neural network, a sequence of instructions to be offloaded for execution by a secondary computing device based on the recognized pattern of memory access and compute instructions, and translating the sequence of instructions to be offloaded from instructions executable by a central processing unit (CPU) into instructions executable by the secondary computing device.

Example 21 includes the method of Example 20, further comprising marking the instructions to be offloaded in a program counter on the CPU, wherein the neural network comprises a recurrent neural network (RNN), wherein the pattern of memory access and compute instructions includes one or more of transitional probabilities or sequential dependencies between instructions of the input set of instructions, and wherein the sequence of instructions to be offloaded includes one or more of a recurring sequence, a sequence having an offload execution time benefit, a sequence that would result in high latency from repeated memory operations, or a sequence that would result in cache misses.

Example 22 includes the method of Example 21, wherein the RNN is trained via one or more of a hardware simulation with benchmarks known to increase cache misses and cause memory latency issues, direct training to detect sequences that result in long latencies of memory access, or embedding the RNN in a reinforcement learning agent.

Example 23 includes the method of Example 20, further comprising, when the CPU is idle, tasking the CPU with a first process to execute the sequence of offloaded instructions, tasking the secondary computing device with a second process, concurrently with the first process, to execute the translated offloaded instructions, if the second process completes prior to the first process, accepting an execution result of the second process and terminating the first process, and otherwise, if the second process does not complete prior to the first process, accepting an execution result of the first process and terminating the second process.

Example 24 includes the method of Example 20, wherein the input set of machine instructions may be provided via a hardware prefetcher having large look-ahead window to capture binary source code and an instruction decoder to decode the captured binary source code into machine instructions.

Example 25 includes the method of any of Examples 20-24, wherein translating the sequence of instructions to be offloaded comprises reading a hardware table that includes direct mapping between the instructions executable by the CPU and the instructions executable by the secondary computing device.

Example 26 includes an apparatus comprising means for performing the method of any of Examples 20-24.

Thus, the adaptive technology described herein provides for speeding up program execution and relieving memory bottlenecks, particularly in multi-threaded applications where there are many ongoing competing demands for CPU resources. The technology increases the efficiency and adaptability of secondary computing hardware by automatically and intelligently determining when it would be faster to execute a given snippet of code on the CPU or on the IMC/CNM hardware device. Additionally, the technology provides efficient handling of parallel processing tasks, coupled with dramatic reduction in data movement, by avoiding frequent data exchange between memory and processor cores, enabling high performance for secondary computing hardware.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
a secondary computing device; and
an apparatus coupled to the secondary computing device, the apparatus including one or more substrates and logic coupled to the one or more substrates, wherein the logic is implemented at least partly in one or more of configurable logic or fixed-functionality hardware logic, the logic coupled to the one or more substrates to:
recognize, via a neural network, a pattern of memory access and compute instructions based on an input set of machine instructions;
determine, via the neural network, a sequence of instructions to be offloaded for execution by the secondary computing device based on the recognized pattern of memory access and compute instructions; and
translate the sequence of instructions to be offloaded from instructions executable by a central processing unit (CPU) into instructions executable by the secondary computing device.

2. The computing system of claim 1, wherein the neural network comprises a recurrent neural network (RNN), wherein the pattern of memory access and compute instructions includes one or more of transitional probabilities or sequential dependencies between instructions of the input set of instructions, wherein the sequence of instructions to be offloaded includes one or more of a recurring sequence, a sequence having an offload execution time benefit, a sequence that would result in high latency from repeated memory operations, or a sequence that would result in cache misses, and wherein the logic coupled to the one or more substrates is further to mark the instructions to be offloaded in a program counter on the CPU.

3. The computing system of claim 2, wherein the RNN is trained via one or more of a hardware simulation with benchmarks known to increase cache misses and cause memory latency issues, direct training to detect sequences that result in long latencies of memory access, or embedding the RNN in a reinforcement learning agent.

4. The computing system of claim 1, wherein the logic coupled to the one or more substrates is further to, when the CPU is idle:
task the CPU with a first process to execute the sequence of instructions;
task the secondary computing device with a second process, concurrently with the first process, to execute the translated sequence of instructions;
if the second process completes prior to the first process, accept an execution result of the second process and terminate the first process; and
otherwise, if the second process does not complete prior to the first process, accept an execution result of the first process and terminate the second process.

5. The computing system of claim 1, wherein the input set of machine instructions may be provided via a hardware prefetcher having a large look-ahead window to capture binary source code and an instruction decoder to decode the captured binary source code into machine instructions.

6. The computing system of claim 1, wherein the logic to translate the sequence of instructions to be offloaded comprises a hardware table that includes direct mapping between the instructions executable by the CPU and the instructions executable by the secondary computing device.

7. A semiconductor apparatus comprising:
one or more substrates; and
logic coupled to the one or more substrates, wherein the logic is implemented at least partly in one or more of configurable logic or fixed-functionality hardware logic, the logic coupled to the one or more substrates to:
recognize, via a neural network, a pattern of memory access and compute instructions based on an input set of machine instructions;
determine, via the neural network, a sequence of instructions to be offloaded for execution by a secondary computing device based on the recognized pattern of memory access and compute instructions; and
translate the sequence of instructions to be offloaded from instructions executable by a central processing unit (CPU) into instructions executable by the secondary computing device.

8. The semiconductor apparatus of claim 7, wherein the neural network comprises a recurrent neural network (RNN), wherein the pattern of memory access and compute instructions includes one or more of transitional probabilities or sequential dependencies between instructions of the input set of instructions, wherein the sequence of instructions to be offloaded includes one or more of a recurring sequence, a sequence having an offload execution time benefit, a sequence that would result in high latency from repeated memory operations, or a sequence that would result in cache misses, and wherein the logic coupled to the one or more substrates is further to mark the instructions to be offloaded in a program counter on the CPU.

9. The semiconductor apparatus of claim 8, wherein the RNN is trained via one or more of a hardware simulation with benchmarks known to increase cache misses and cause memory latency issues, direct training to detect sequences that result in long latencies of memory access, or embedding the RNN in a reinforcement learning agent.

10. The semiconductor apparatus of claim 7, wherein the logic coupled to the one or more substrates is further to, when the CPU is idle:
task the CPU with a first process to execute the sequence of instructions;
task the secondary computing device with a second process, concurrently with the first process, to execute the translated sequence of instructions;
if the second process completes prior to the first process, accept an execution result of the second process and terminate the first process; and
otherwise, if the second process does not complete prior to the first process, accept an execution result of the first process and terminate the second process.

11. The semiconductor apparatus of claim 7, wherein the input set of machine instructions may be provided via a hardware prefetcher having a large look-ahead window to capture binary source code and an instruction decoder to decode the captured binary source code into machine instructions.

12. The semiconductor apparatus of claim 7, wherein the logic to translate the sequence of instructions to be offloaded comprises a hardware table that includes direct mapping between the instructions executable by the CPU and the instructions executable by the secondary computing device.

13. The semiconductor apparatus of claim 7, wherein the logic coupled to the one or more substrates includes transistor channel regions that are positioned within the one or more substrates.

14. At least one non-transitory computer readable storage medium comprising a set of first instructions which, when executed by a computing system, cause the computing system to:
- recognize, via a neural network, a pattern of memory access and compute instructions based on an input set of machine instructions;
- determine, via the neural network, a sequence of instructions to be offloaded for execution by a secondary computing device based on the recognized pattern of memory access and compute instructions; and
- translate the sequence of instructions to be offloaded from instructions executable by a central processing unit (CPU) into instructions executable by the secondary computing device.

15. The at least one non-transitory computer readable storage medium of claim 14, wherein the neural network comprises a recurrent neural network (RNN), wherein the pattern of memory access and compute instructions includes one or more of transitional probabilities or sequential dependencies between instructions of the input set of instructions, wherein the sequence of instructions to be offloaded includes one or more of a recurring sequence, a sequence having an offload execution time benefit, a sequence that would result in high latency from repeated memory operations, or a sequence that would result in cache misses, and wherein the first instructions, when executed, further cause the computing system to mark the instructions to be offloaded in a program counter on the CPU.

16. The at least one non-transitory computer readable storage medium of claim 15, wherein the RNN is trained via one or more of a hardware simulation with benchmarks known to increase cache misses and cause memory latency issues, direct training to detect sequences that result in long latencies of memory access, or embedding the RNN in a reinforcement learning agent.

17. The at least one non-transitory computer readable storage medium of claim 14, wherein the first instructions, when executed, further cause the computing system to, when the CPU is idle:
- task the CPU with a first process to execute the sequence of instructions;
- task the secondary computing device with a second process, concurrently with the first process, to execute the translated sequence of instructions;
- if the second process completes prior to the first process, accept an execution result of the second process and terminate the first process; and
- otherwise, if the second process does not complete prior to the first process, accept an execution result of the first process and terminate the second process.

18. The at least one non-transitory computer readable storage medium of claim 14, wherein the input set of machine instructions may be provided via a hardware prefetcher having a large look-ahead window to capture binary source code and an instruction decoder to decode the captured binary source code into machine instructions.

19. The at least one non-transitory computer readable storage medium of claim 14, wherein to translate the sequence of instructions to be offloaded comprises reading a hardware table that includes direct mapping between the instructions executable by the CPU and the instructions executable by the secondary computing device.

20. A method of offloading instructions for execution, comprising:
- recognizing, via a neural network, a pattern of memory access and compute instructions based on an input set of machine instructions;
- determining, via the neural network, a sequence of instructions to be offloaded for execution by a secondary computing device based on the recognized pattern of memory access and compute instructions; and
- translating the sequence of instructions to be offloaded from instructions executable by a central processing unit (CPU) into instructions executable by the secondary computing device.

21. The method of claim 20, further comprising marking the instructions to be offloaded in a program counter on the CPU, wherein the neural network comprises a recurrent neural network (RNN), wherein the pattern of memory access and compute instructions includes one or more of transitional probabilities or sequential dependencies between instructions of the input set of instructions, and wherein the sequence of instructions to be offloaded includes one or more of a recurring sequence, a sequence having an offload execution time benefit, a sequence that would result in high latency from repeated memory operations, or a sequence that would result in cache misses.

22. The method of claim 21, wherein the RNN is trained via one or more of a hardware simulation with benchmarks known to increase cache misses and cause memory latency issues, direct training to detect sequences that result in long latencies of memory access, or embedding the RNN in a reinforcement learning agent.

23. The method of claim 20, further comprising, when the CPU is idle:
- tasking the CPU with a first process to execute the sequence of instructions;
- tasking the secondary computing device with a second process, concurrently with the first process, to execute the translated sequence of instructions;
- if the second process completes prior to the first process, accepting an execution result of the second process and terminating the first process; and
- otherwise, if the second process does not complete prior to the first process, accepting an execution result of the first process and terminating the second process.

24. The method of claim 20, wherein the input set of machine instructions may be provided via a hardware prefetcher having a large look-ahead window to capture binary source code and an instruction decoder to decode the captured binary source code into machine instructions.

25. The method of claim 20, wherein translating the sequence of instructions to be offloaded comprises reading a hardware table that includes direct mapping between the instructions executable by the CPU and the instructions executable by the secondary computing device.

* * * * *